US009068610B2

(12) United States Patent
Philpott

(10) Patent No.: US 9,068,610 B2
(45) Date of Patent: Jun. 30, 2015

(54) BRAKE CALIPER ASSEMBLY HAVING A SPACER TAPE AND A METHOD OF MANUFACTURE

(71) Applicant: ArvinMeritor Technology, LLC, Troy, MI (US)

(72) Inventor: Daniel Philpott, Oxford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 196 days.

(21) Appl. No.: 13/710,600

(22) Filed: Dec. 11, 2012

(65) Prior Publication Data

US 2014/0158482 A1   Jun. 12, 2014

(51) Int. Cl.
   *F16D 65/00*   (2006.01)

(52) U.S. Cl.
   CPC ....... *F16D 65/0075* (2013.01); *Y10T 29/49826* (2015.01); *F16D 65/0043* (2013.01)

(58) Field of Classification Search
   USPC .................................................. 206/713, 411
   See application file for complete search history.

(56) References Cited

U.S. PATENT DOCUMENTS

| 285,385 | A | * | 9/1883 | Brundage | 215/280 |
|---|---|---|---|---|---|
| 1,818,088 | A | * | 8/1931 | Norton | 188/250 R |
| 2,750,315 | A | * | 6/1956 | Tierney | 428/295.4 |
| 3,073,304 | A | * | 1/1963 | Schaar | 602/59 |
| 3,085,024 | A | * | 4/1963 | Blackford | 428/43 |
| 3,183,116 | A | * | 5/1965 | Schaar | 427/208.6 |
| 4,264,397 | A | * | 4/1981 | Kawashima et al. | 156/361 |
| 4,454,632 | A | * | 6/1984 | Nix et al. | 24/16 PB |
| 4,557,361 | A | * | 12/1985 | Nix et al. | 192/85.59 |
| 4,581,979 | A | * | 4/1986 | Compton et al. | 92/23 |
| 4,585,107 | A | * | 4/1986 | Leigh-Monstevens | 192/85.51 |
| 4,665,802 | A | * | 5/1987 | Barker et al. | 92/23 |
| 4,766,804 | A | * | 8/1988 | Barker | 92/23 |
| 4,995,492 | A | * | 2/1991 | Babcock et al. | 192/85.51 |
| 5,002,169 | A | * | 3/1991 | Barker | 192/85.59 |
| 5,496,605 | A | * | 3/1996 | Augst et al. | 428/43 |
| 6,224,976 | B1 | * | 5/2001 | Takushima et al. | 428/355 R |
| 6,464,045 | B2 | * | 10/2002 | Weber et al. | 188/18 A |
| 6,772,672 | B2 | * | 8/2004 | Kosugi et al. | 92/23 |
| 7,051,848 | B2 | * | 5/2006 | Roszman et al. | 188/251 A |
| 7,353,921 | B2 | * | 4/2008 | Dennis et al. | 188/73.32 |
| 7,798,575 | B1 | * | 9/2010 | Brotherton | 301/6.1 |
| 7,856,796 | B2 | * | 12/2010 | Trebilcock et al. | 53/415 |
| 2003/0096076 | A1 | * | 5/2003 | Allison | 428/43 |
| 2003/0230577 | A1 | * | 12/2003 | Smith | 220/315 |
| 2006/0027426 | A1 | * | 2/2006 | Roszman et al. | 188/71.1 |
| 2006/0237269 | A1 | * | 10/2006 | Farooq | 188/250 G |
| 2008/0110707 | A1 | * | 5/2008 | Kromer | 188/218 A |
| 2008/0244867 | A1 | * | 10/2008 | Tuell | 16/250 |
| 2009/0173660 | A1 | * | 7/2009 | Lee et al. | 206/713 |
| 2009/0238501 | A1 | * | 9/2009 | Minkler | 383/207 |

* cited by examiner

*Primary Examiner* — Robert A Siconolfi
*Assistant Examiner* — James Hsiao
(74) *Attorney, Agent, or Firm* — Brooks Kushman P.C.

(57) ABSTRACT

A brake caliper assembly having a spacer tape and a method of manufacture. The brake caliper assembly may include a carrier, a housing assembly disposed on the carrier, and a spacer tape. The spacer tape may engage the carrier and the housing assembly. The spacer tape may have a perforation that severs to permit movement of the housing assembly with respect to the carrier.

20 Claims, 3 Drawing Sheets

BRAKE CALIPER ASSEMBLY HAVING A SPACER TAPE AND A METHOD OF MANUFACTURE

TECHNICAL FIELD

The present application relates to a brake caliper assembly and a method of manufacture.

BACKGROUND

A caliper having a pad shield is disclosed in U.S. Patent Publication No. 2008/0110707.

SUMMARY

In at least one embodiment, a brake caliper assembly is provided. The brake caliper assembly may include a carrier, a housing assembly, first and second brake pad assemblies, and a spacer tape. The carrier may be configured to be coupled to a vehicle. The housing assembly may be moveably disposed on the carrier and may define an opening. The first and second brake pad assemblies may be disposed on the housing assembly in the opening. The spacer tape may engage the carrier and the housing assembly. The spacer tape may have a perforation that severs to permit movement of the housing assembly with respect to the carrier.

In at least one embodiment, a brake caliper assembly is provided. The brake caliper assembly may have a carrier, a housing assembly that is moveably disposed on the carrier, first and second brake pad assemblies that are disposed on the housing assembly, and a spacer tape. The spacer tape may extend from the carrier to the housing assembly and may have a perforation. The spacer tape may sever along the perforation when the first and second brake pad assemblies are actuated toward each other.

In at least one embodiment, a method of manufacturing a brake caliper assembly is provided. The method may include providing a housing assembly that is moveably disposed on a carrier and affixing a spacer tape to the carrier and the housing assembly to inhibit movement of the housing assembly with respect to the carrier. The housing assembly may receive first and second brake pad assemblies.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
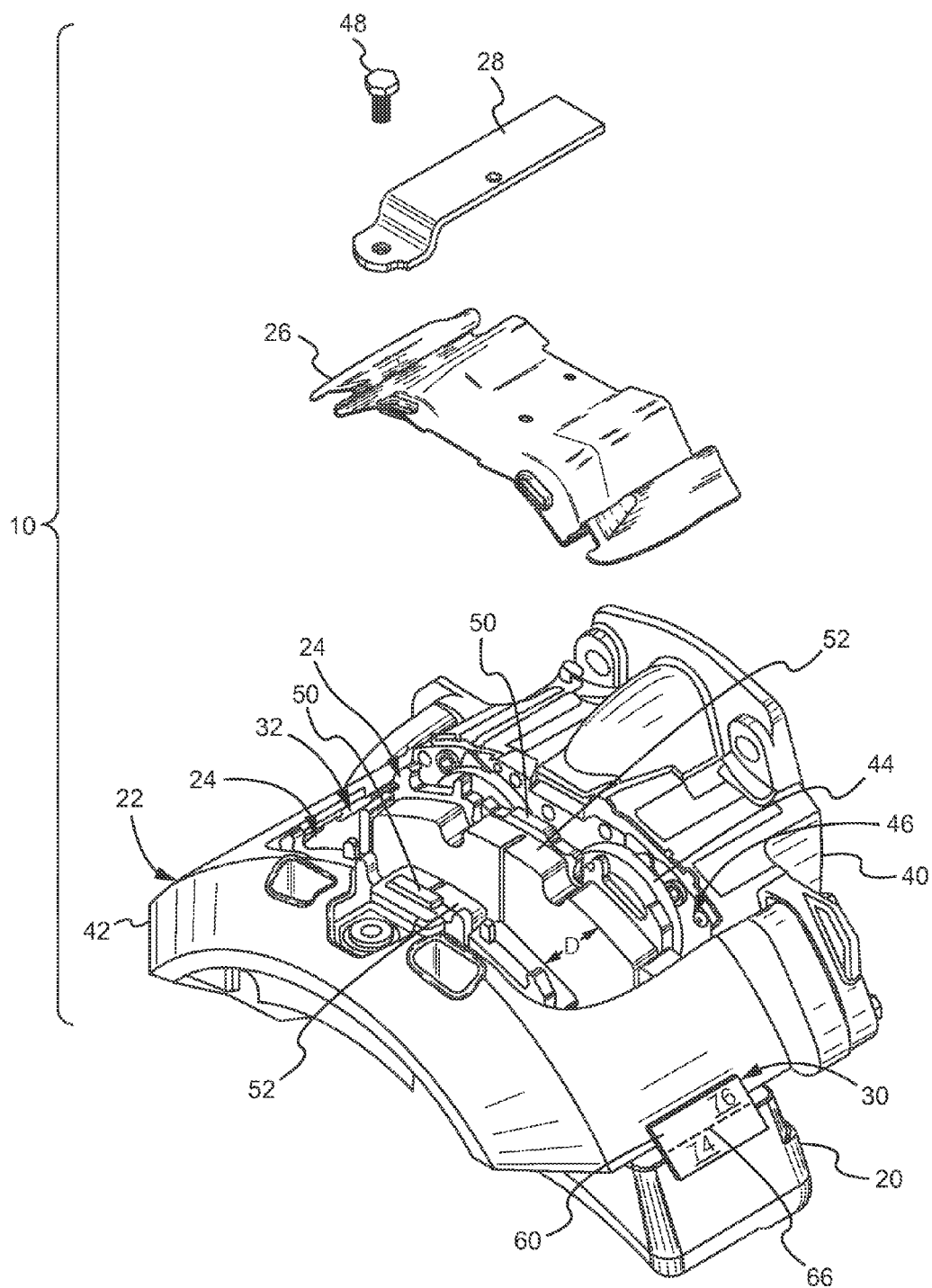
FIG. 1 is a partially exploded perspective view of a brake caliper assembly.

Referring to FIG. 1, an exemplary brake caliper assembly 10 is shown. The brake caliper assembly 10 may be provided as part of a vehicle, such as a motor vehicle like a truck, bus, farm equipment, military transport or weaponry vehicle, or cargo loading equipment for land, air, or marine vessels. In at least one embodiment, the brake caliper assembly 10 may include a carrier 20, a housing assembly 22, a plurality of brake pad assemblies 24, a pad shield 26, a retainer bracket 28, and a spacer tape 30.

The carrier 20 may be fixedly mounted to the vehicle. For example, the carrier 20 may be connected to an axle or steering knuckle, such as with an intermediate component like a torque plate in one or more embodiments. The carrier 20 may receive and/or support the brake pad assemblies 24 and may include a rotor opening 32 that may be configured to receive the rotor, also known as a brake disc. As such, the carrier 20 may straddle the rotor and help position the brake pad assemblies 24 on opposite sides of the rotor.

The housing assembly 22 may receive various components of the brake caliper assembly 10. In addition, the housing assembly 22 may facilitate positioning of the brake pad assemblies 24 with respect to the rotor to facilitate braking of the vehicle. In at least one embodiment, the housing assembly 22 may include a caliper housing 40 and a caliper bridge 42.

The caliper housing 40 may be movably disposed on the carrier 20. For example, the caliper housing 40 may be slidably disposed on a pair of slide pins that may be fixedly disposed on the carrier 20. The caliper housing 40 may receive an actuator 44, such as at least one piston, that may actuate the brake pad assemblies 24 into engagement with the rotor. More specifically, the actuator 44 may actuate a brake pad assembly 24 disposed proximate the caliper housing 40 toward the rotor and move the caliper housing 40 and caliper bridge 42 to actuate the brake pad assembly 24 disposed proximate the caliper bridge 42 toward an opposite side of the rotor. The actuator 44 may be pneumatically actuated in one or more embodiments.

The caliper bridge 42 may be integrally formed with or may be fixedly disposed on the caliper housing 40. For example, the caliper bridge 42 may be coupled to the caliper housing 40 with one or more fasteners, such as a bolt. The caliper bridge 42 may cooperate with the caliper housing 40 to at least partially define an opening 46. In at least one embodiment, the brake pad assemblies 24, pad shield 26, and/or retainer bracket 28 may be at least partially disposed in the opening 46.

The brake pad assemblies 24 may be configured to engage opposite sides of the rotor to slow the rotation of a vehicle wheel. The brake pad assemblies 24 may have similar or identical configurations. In at least one embodiment, the brake pad assemblies 24 may include a backing plate 50 and a friction material 52.

The backing plate 50 may be a structural member of a brake pad assembly 24. The backing plate 50 may be made of any suitable material, such as a metal or metal alloy.

The friction material 52 may be disposed on the backing plate 50. The friction material 52 may face toward the rotor and may engage the rotor during vehicle braking.

The pad shield 26 may be disposed in the opening 46. The pad shield 26 may help shield the friction material 52 of the brake pad assemblies 24 from water or contaminants. The pad shield 26 may be made of any suitable material, such as a metal alloy like stainless steel or carbon fiber.

Figure 2:
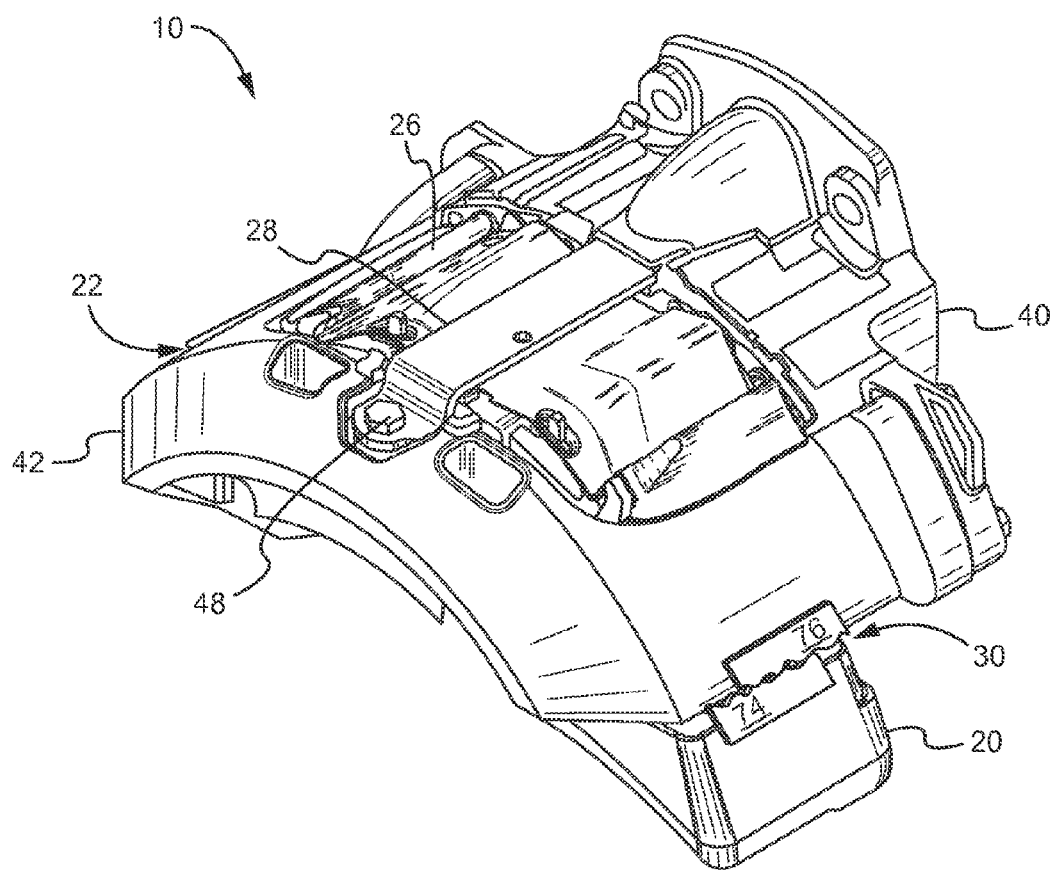
FIG. 2 is a perspective view of the brake caliper assembly actuated from the position shown in FIG. 1.

The retainer bracket 28 may secure the pad shield 26 to the housing assembly 22 as is best shown in FIG. 2. The retainer bracket 28 may have a first end that may engage or may be received in a notch in the caliper housing 40 and a second end that may be fixedly disposed on the caliper bridge 42. For example, the second end may receive a fastener 48, such as a bolt, that may couple the retainer bracket 28 to the caliper bridge 42.

Figure 3:
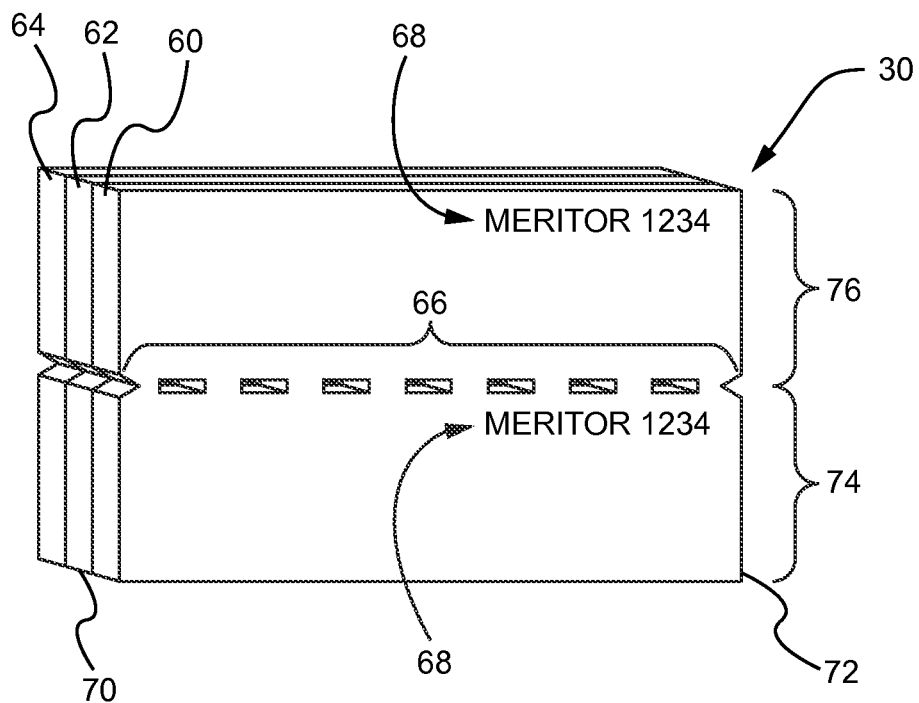
FIG. 3 is a perspective view of an exemplary spacer tape.

Referring to FIGS. 1-3, the spacer tape 30 may extend between and may engage the carrier 20 and the housing assembly 22. Moreover, the spacer tape 30 may be configured to help control movement of the housing assembly 22 with respect to the carrier 20 as will be discussed in more detail below. The spacer tape 30 may include a plurality of layers. In at least one embodiment, the spacer tape 30 may include a foil layer 60, a liner layer 62, and an adhesive layer 64. In addition, the spacer tape 30 may include a perforation 66 and one or more markings 68.

The foil layer 60 may be an external surface of the spacer tape 30. In at least one embodiment, the foil layer 60 may be laminated or bonded to the liner layer 62. The foil layer 60 may be made of a metal or metal alloy, such as an aluminum alloy. As such, the foil layer 60 may help the spacer tape 30 retain a desired shape and not curl when disposed on the carrier 20 and housing assembly 22.

The liner layer 62 may be disposed between and may engage the foil layer 60 and the adhesive layer 64. The liner layer 62 may provide structural reinforcement and may be made of any suitable material. For instance, the liner layer 62 may be a woven material, such as woven fibers, or an unwoven material such as Kraft paper.

The adhesive layer 64 may facilitate mounting of the spacer tape 30. In at least one embodiment, the adhesive layer 64 may be laminated to a surface of the liner layer 62 that is disposed opposite the foil layer 60. The adhesive layer 64 may be made of any suitable material, such as synthetic rubber.

The perforation 66 may be configured as a series of indentations or holes that may be spaced apart and may extend at least partially through the spacer tape 30. For instance, the perforation 66 may extend through the foil layer 60, liner layer 62, and adhesive layer 64 in one or more embodiments. The perforation 66 or indentations or holes thereof may be arranged along a line and may extend from a first end 70 of the spacer tape 30 to a second end 72 that is disposed opposite the first end 70. In at least one embodiment, the perforation 66 may extend along a straight line and may be disposed proximate the center of the spacer tape 30. The perforation 66 may divide the spacer tape 30 into first and second portions 74, 76 that may be disposed on opposite sides of the perforation 66 or perforation line. The first and second portions 74, 76 may engage different components of the brake caliper assembly 10. For instance, the first portion 74 may engage the carrier 20 and the second portion 76 may engage the caliper bridge 42.

The perforation 66 may preweaken the spacer tape 30 such that the spacer tape 30 may be predisposed to tear, sever, or separate along the perforation 66. Severing of the spacer tape 30 along the perforation 66 may occur when the housing assembly 22 is moved with respect to the carrier 20. Such tearing may be accomplished by actuating the brake caliper assembly 10. For instance, the actuator 44 may actuate the housing assembly 22 with respect to the carrier 20, which may also actuate the brake pad assemblies 24 toward each other, reducing the distance D (shown in FIG. 1) between the brake pad assemblies 24. Alternatively, severing may be achieved manually, such as by cutting the spacer tape 30.

The spacer tape 30 may inhibit movement when the perforation 66 is not severed. For instance, the spacer tape 30 may inhibit movement of the housing assembly 22 with respect to the carrier 20 before the actuator 44 is operated or before the brake pad assemblies 24 are actuated toward each other. As such, the spacer tape 30 may hold the brake pad assemblies 24 a predetermined distance D from each other before the perforation 66 severs.

Markings 68 may be provided on the foil layer 60. The markings may be formed by deforming the foil layer, such as by indenting or embossing the foil layer 60. As such, the markings 68 may be visible through paint or other thin material layers that may be disposed over the spacer tape 30 or on the brake caliper assembly 10. Markings 68 may provide information that may include but may not be limited to a part number, manufacturing date, serial number, customer part number, vehicle type, and/or manufacturing location. Such information may be provided in an alphanumeric format or a non-alphanumeric format, such as a barcode or the like. Common markings may be provided on the first and second portions 74, 76 of the spacer tape 30. Such common or repeated markings 68 may allow information to be provided with the carrier 20 and the housing assembly 22 after the perforation 66 is severed regardless of whether the carrier 20 and housing assembly 22 remain assembled or are disassembled from each other.

Various methods of manufacturing a brake caliper assembly 10 will now be discussed in more detail. In at least one embodiment, components of the brake caliper assembly 10 other than the spacer tape 30 may be assembled together. For instance, the caliper housing 40 and the caliper bridge 42 may be assembled to form the housing assembly 22, and the housing assembly 22, brake pad assemblies 24, and pad shield 26 may be mounted on or moveably disposed with respect to the carrier 20. After assembly, the brake pad assemblies 24 may be positioned a predetermined distance D from each other such to allow the rotor to be received in the rotor opening 32. As such, the housing assembly 22 may be positioned with respect to the carrier 20 such as is shown in FIG. 1.

The spacer tape 30 may be prepared before being assembled to the brake caliper assembly 10. For example, the spacer tape 30 may be provided on a roll and may receive a perforation and may be cut to a desired length. The perforation may be provided during manufacture of the spacer tape 30, while the spacer tape 30 is on the roll, or by unwinding the spacer tape 30 from the roll and perforating the spacer tape 30 with a cutting tool. The spacer tape 30 may be cut to a desired length with another cutting tool in a manner known by those skilled in the art. In addition, markings 68 may be provided on the spacer tape 30 as previously discussed. Such markings 68 may be provided with the first and/or second portions 74, 76 of the foil layer 60 prior to cutting the spacer tape 30 to the predetermined length in one or more embodiments.

After positioning the housing assembly 22 with respect to the carrier 20 or positioning the brake pad assemblies 24 a predetermined distance D from each other, the spacer tape 30 may then be positioned and affixed to the carrier 20 and the housing assembly 22 to inhibit movement of the housing assembly 22 with respect to the carrier 20. The spacer tape 30 may be positioned such that the adhesive layer 64 of the first portion 74 engages the carrier 20, the adhesive layer 64 of the second portion 76 engages the housing assembly 22, and the perforation 66 is disposed between the carrier 20 and the housing assembly 22. As such, the perforation 66 may be spaced apart from the carrier 20 and housing assembly 22 in one or more embodiments. Installation may be facilitated by used of a rubber stamp or pad that may not upset or distort any markings 68 that have been provided on the foil layer 60.

Next, the brake caliper assembly 10 may be positioned to receive a rotor between the brake pad assemblies 24. The brake caliper assembly 10 may receive a rotor when it is mounted on a vehicle or a subassembly that includes a rotor.

Next, the spacer tape 30 may be severed to permit movement of the housing assembly 22 with respect to the carrier 20. The spacer tape 30 may sever along the perforation 66 as previously discussed. For instance, the actuator 44 may actuate the housing assembly 22 with respect to the carrier 20 to sever the spacer tape 30 along the perforation 66 as is best shown in FIG. 2.

The brake caliper assembly 10 and method of manufacture described above may allow a brake caliper assembly 10 to be made without the use of a pad spacer that may engage and separate opposing brake pad assemblies 24. For instance, a pad spacer such as a wad of paper that is jammed between the brake pad assemblies 24 or custom plastic clips may be eliminated. In addition, the elimination of such pad spacers may simplify assembly of a brake caliper assembly 10. For example, elimination of a pad spacer may allow a brake caliper assembly 10 to be provided with an installed pad shield 26 or a pad shield 26 that does not need to be removed and reinstalled to extract the pad spacer through the opening 46 when the rotor is received between the brake pad assemblies 24. In addition, the use of a spacer tape 30 may allow a predetermined gap to be maintained between opposing brake pad assemblies 24 so that a rotor may be easily received.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake caliper assembly comprising:
   a carrier configured to be coupled to a vehicle;
   a housing assembly that is moveably disposed on the carrier and defines an opening;
   first and second brake pad assemblies that are disposed on the housing assembly in the opening; and
   a spacer tape that engages the carrier and the housing assembly, wherein the spacer tape has a perforation that severs to permit movement of the housing assembly with respect to the carrier, wherein the perforation divides the spacer tape into first and second portions that are disposed on opposite sides of the perforation, wherein the first portion is affixed to the carrier and the second portion is affixed to the housing assembly and the perforation is provided before the spacer tape is affixed to the carrier and the housing assembly.

2. The brake caliper assembly of claim 1 wherein the spacer tape severs along the perforation when the housing assembly actuates the first and second brake pad assemblies.

3. The brake caliper assembly of claim 1 wherein the spacer tape inhibits movement of the housing assembly with respect to the carrier prior to actuation of the first and second brake pad assemblies.

4. The brake caliper assembly of claim 1 wherein the housing assembly includes a caliper housing and a caliper bridge fixedly disposed on the caliper housing, wherein the first portion of the spacer tape engages the carrier and the second portion of the spacer tape engages the caliper bridge.

5. The brake caliper assembly of claim 4 wherein the caliper housing and the caliper bridge cooperate to define an opening that receives a pad shield.

6. A brake caliper assembly comprising:
   a carrier;
   a housing assembly that is moveably disposed on the carrier;
   first and second brake pad assemblies that are disposed on the housing assembly; and
   a spacer tape that extends from the carrier to the housing assembly, wherein the spacer tape has a perforation and the spacer tape severs along the perforation when the first and second brake pad assemblies are actuated toward each other, wherein the spacer tape includes a foil layer that defines an external surface of the spacer tape, wherein markings are provided on the spacer tape that are indented into the foil layer.

7. The brake caliper assembly of claim 6 wherein the spacer tape engages the carrier and the housing assembly to hold the first and second brake pad assemblies a predetermined distance from each other before severing along the perforation.

8. The brake caliper assembly of claim 6 wherein the perforation is substantially linear and extends from a first end of the spacer tape to a second end of the spacer tape that is disposed opposite the first end.

9. The brake caliper assembly of claim 6 wherein the perforation extends completely through the spacer tape.

10. The brake caliper assembly of claim 6 wherein the perforation divides the spacer tape into first and second portions that are disposed on opposite sides of the perforation, wherein the first portion is affixed to the carrier and the second portion is affixed to the housing assembly.

11. A method of manufacturing a brake caliper assembly comprising:
    providing a housing assembly that is moveably disposed on a carrier, wherein the housing assembly receives first and second brake pad assemblies; and
    affixing a spacer tape to the carrier and the housing assembly to inhibit movement of the housing assembly with respect to the carrier;
    wherein the spacer tape is provided with a perforation before being affixed to the carrier and the housing assembly and the perforation divides the spacer tape into first and second portions that are disposed on opposite sides of the perforation, wherein the step of affixing the spacer tape includes affixing the first portion to the carrier and the second portion to the housing assembly.

12. The method of claim 11 wherein the perforation is spaced apart from the carrier.

13. The method of claim 11 wherein the perforation is spaced apart from the carrier and the housing assembly.

14. The method of claim 11 wherein the perforation is spaced apart from the housing assembly.

15. The method of claim 11 wherein the housing assembly includes a caliper housing and a caliper bridge, wherein the caliper housing has an actuator that is configured to actuate the housing assembly with respect to the carrier and the caliper bridge is fixedly disposed on the caliper housing, wherein the second portion of the spacer tape engages the caliper bridge.

16. The method of claim 15 further comprising actuating the housing assembly with respect to the carrier to sever the spacer tape along the perforation.

17. The method of claim 11 wherein the spacer tape is cut to a predetermined length before being affixed to the carrier and the housing assembly.

18. The method of claim 17 wherein the spacer tape includes a foil layer and wherein markings are provided on the spacer tape prior to cutting the spacer tape to the predetermined length.

19. The method of claim 18 wherein common markings are provided on the first and second portions prior to cutting the spacer tape to the predetermined length.

20. The method of claim 11 wherein a pad shield is installed on the housing assembly prior to affixing the spacer tape.

* * * * *